(12) United States Patent
Henke (10) Patent No.: US 10,519,952 B2
(45) Date of Patent: Dec. 31, 2019

(54) MELT PUMPS FOR PRESSING SYNTHETIC MATERIAL THROUGH A TOOL

(71) Applicant: HENKE Property UG (haftungsbeschränkt), Kassel (DE)

(72) Inventor: Matthias Henke, Kassel (DE)

(73) Assignee: Henke Property UG, Kassel (DE)

( * ) Notice: Subject to any disclaimer, the term of this patent is extended or adjusted under 35 U.S.C. 154(b) by 326 days.

(21) Appl. No.: 14/581,412

(22) Filed: Dec. 23, 2014

(65) Prior Publication Data
US 2015/0184655 A1 Jul. 2, 2015

(30) Foreign Application Priority Data

Dec. 26, 2013 (DE) .................... 10 2013 021 902

(51) Int. Cl.
*F04C 15/00* (2006.01)
*B29B 7/46* (2006.01)
(Continued)

(52) U.S. Cl.
CPC ............ *F04C 15/0061* (2013.01); *B29B 7/46* (2013.01); *B29B 7/80* (2013.01); *B29C 48/252* (2019.02);
(Continued)

(58) Field of Classification Search
CPC .. F04C 2/14–20; F04C 2/084; F04C 15/0061; F04C 15/0073;
(Continued)

(56) References Cited

U.S. PATENT DOCUMENTS 2,543,307 A 2/1951 Swallow et al.
2,908,226 A 10/1959 Rich et al.
(Continued)

FOREIGN PATENT DOCUMENTS

CH 269238 10/1950
CN 101362377 2/2009
(Continued)

OTHER PUBLICATIONS

Neubauer, Achim, "Gegenlaufig drehende, parallele Doppelschneckenextruder", Der Doppelschneckenextruder im Exuusionsprozess, 1991, ISSN 3-18-234158-8, pp. 73-96, 14 pages.
(Continued)

*Primary Examiner* — Alexander B Comley
(74) *Attorney, Agent, or Firm* — Hanley, Flight & Zimmerman, LLC (57) ABSTRACT

Melt pumps for pressing synthetic melt through a tool are disclosed. An example melt pump for building up pressure for pressing synthetic melt through a tool includes a compressor with two worm conveyors disposed in a housing, a transmission by means of which the worm conveyors are synchronously drivable, and a drive, where the transmission is disposed between the drive and the compressor. In the example melt pump, each worm conveyor in the transmission has an output shaft, and each worm conveyor is coupled to the corresponding output shaft by a coupling. In the example melt pump, the coupling comprises an output gear provided on the output shaft, and a drive gear provided on the worm conveyor and a coupling sleeve gripping the output gear and the drive gear, where the drive gear and the output gear have a different number of teeth.

27 Claims, 10 Drawing Sheets

(51) Int. Cl.
  *B29C 48/25* (2019.01)
  *B29C 48/40* (2019.01)
  *F16D 1/10* (2006.01)
  *B29B 7/80* (2006.01)
  *F04C 2/14* (2006.01)
  *F16D 1/12* (2006.01)

(52) U.S. Cl.
  CPC ........ *B29C 48/2526* (2019.02); *B29C 48/402* (2019.02); *F04C 2/14* (2013.01); *F16D 1/10* (2013.01); *F16D 1/12* (2013.01); *F16D 2001/103* (2013.01)

(58) Field of Classification Search
  CPC .... B29C 47/0801–0805; B29C 47/402; B29C 48/252; B29C 48/402; B29C 48/2526; Y10T 403/7026; Y10T 403/7035; Y10T 403/5706; Y10T 403/5733; F16D 1/10; F16D 2001/103; B29B 7/46
  USPC .................. 417/410.4; 418/201.1–203, 190; 403/359.1, 348; 74/412, 665; 29/893–893.37; 366/76.4
  See application file for complete search history.

(56) References Cited

U.S. PATENT DOCUMENTS

| | | | |
|---|---|---|---|
| 3,407,439 | A | 10/1968 | Gregory |
| 4,408,888 | A | 10/1983 | Hanslik |
| 4,527,899 | A * | 7/1985 | Blach ............... B29B 7/488 100/117 |
| 4,679,461 | A | 7/1987 | Mizuguchi et al. |
| 5,179,521 | A | 1/1993 | Edge |
| 5,348,453 | A | 9/1994 | Baran et al. |
| 6,165,399 | A | 12/2000 | Güntherberg et al. |
| 6,213,745 | B1 * | 4/2001 | Woodcock ............ F01C 21/02 384/291 |
| 6,234,661 | B1 | 5/2001 | Thewes |
| 6,298,751 | B1 | 10/2001 | Ide et al. |
| 6,632,145 | B2 | 10/2003 | Vanmoor |
| 2005/0186301 | A1 | 8/2005 | Koumo et al. |
| 2006/0233903 | A1 | 10/2006 | Munz |
| 2007/0104814 | A1 | 5/2007 | Munz et al. |
| 2007/0109911 | A1 | 5/2007 | Neubauer |
| 2015/0086669 | A1 | 3/2015 | Henke |
| 2017/0182694 | A1 | 6/2017 | Henke |

FOREIGN PATENT DOCUMENTS

| | | | |
|---|---|---|---|
| CN | 102205620 | | 10/2011 |
| CN | 102865311 | | 1/2013 |
| DE | 231029 | | 12/1985 |
| DE | 3842988 | | 6/1989 |
| DE | 3815158 | | 11/1989 |
| DE | 4015814 | | 4/1991 |
| DE | 102013010505 | | 1/2014 |
| EP | 0132525 | | 5/1984 |
| EP | 0564884 | | 10/1993 |
| EP | 1008437 | | 6/2000 |
| EP | 1365906 | | 12/2003 |
| EP | 1574316 | | 9/2005 |
| EP | 1829665 | | 9/2007 |
| EP | 1925423 | | 5/2008 |
| EP | 2048394 | | 4/2009 |
| GB | 812884 | | 5/1959 |
| GB | 1483302 | | 7/1975 |
| GB | 1483302 | | 8/1977 |
| GB | 1483302 | A * | 8/1977 ......... B29C 47/0801 |
| JP | S59164124 | | 9/1984 |
| JP | S608032 | | 1/1985 |
| JP | SH1148240 | | 2/1999 |
| KR | 100749729 | | 8/2007 |
| KR | 20120104113 | | 9/2012 |
| WO | 2002070231 | | 9/2002 |
| WO | 03095178 | | 11/2003 |
| WO | 2007073009 | | 6/2007 |
| WO | 2010109486 | | 9/2010 |
| WO | 2014000725 | | 1/2014 |

OTHER PUBLICATIONS

Canadian Intellectual Property Office, "Examiner's Report", issued in connection with Canadian Patent Application No. 2,872,741, dated Nov. 2, 2015, 4 pages.
State Intellectual Property Office of the People's Republic of China, English version of "Second Office Action," issued in connection with Chinese Patent Application No. 201380019926.9, dated Aug. 24, 2016, 15 pages.
European Patent Office, "European Search Report", issued by in connection with European Patent Application No. EP 14 00 4211, dated May 4, 2015, 2 pages.
The Eurasian Patent Office, "Patent Search Report", issued in connection with Eurasian Application No. 201401313, dated Apr. 2, 2015, 1 page.
German Patent Office, extract from "Office Action", issued in connection with German Application No. 10 2013 021 902.7, 1 page.
United States Patent and Trademark Office, "Non-Final Office Action", issued in connection with U.S. Appl. No. 14/565,983, dated Apr. 6, 2017 (12 pages).
United States Patent and Trademark Office, "Restriction", issued in connection with U.S. Appl. No. 14/565,983, dated Oct. 20, 2016 (6 pages).
Patent Cooperation Treaty, "International Search Report", issued by the International Searching Authority in connection with PCT application No. PCT/DE2013/000327, dated Jan. 29, 2014, 5 pages.
Patent Cooperation Treaty, "Written Opinion", issued by the International Searching Authority in connection with PCT application No. PCT/DE2013/000327, dated Jan. 29, 2014, 6 pages.
German Patent Office "Office Action", issued in connection with German Application No. 10 2012 012 444.9, dated Feb. 15, 2013, 5 pages.
Hensen et al., "Handbuch der Kunststoff-extrusionstechnik I Grundlagen", München, Wien : Carl Hanser, 1989. 298—ISBN 3-446-14339-4, 2 pages.
Gerhard Schenkel, "Schneckenpressen für Kunststoffe", München: Carl Hanser, 1959.—ISBN keine, 3 pages.
Patent Cooperation Treaty, "International Preliminary Report on Patentability", issued by the International Searching Authority in connection with PCT Application No. PCT/DE2013/000327, dated Dec. 31, 2014, 10 pages.
United States Patent and Trademark Office, "Non-Final Office Action," issued in connection with U.S. Appl. No. 14/565,983, dated Nov. 29, 2018, 11 pages.

* cited by examiner

MELT PUMPS FOR PRESSING SYNTHETIC MATERIAL THROUGH A TOOL

RELATED APPLICATION

This patent arises as a continuation of German Patent Application No. DE 10 2013 021 902.7, filed on Dec. 26, 2013, which is hereby incorporated herein by reference in its entirety.

FIELD OF THE DISCLOSURE

This disclosure relates generally to melt pumps and, more particularly, melt pumps for pressing synthetic material through a tool.

BACKGROUND

During manufacturing of synthetic parts, synthetic melt is typically first produced from different basic materials in a polymerization process in a worm machine. Additives such as, for example, calcium carbonate, woodchips, glass beads or similar materials may also be added to the melt of synthetic material. The synthetic melt also refers to melts produced from renewable resources, such as proteins for example. Worm machines may be compounders, extruders, worm mixers or similar devices to manufacture synthetic melt.

To manufacture synthetic granules, which are then further processed, for example, in synthetic material injection molding machines, the synthetic melt is typically pressed at up to 30 bar through a tool such as a perforated disc. To manufacture a synthetic material profile or a synthetic material molded part, the synthetic melt is typically pressed in an extrusion process at up to 300 bar through a suitable extrusion die or molding tool.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

The examples disclosed herein relate to a melt pumps to build up pressure to press synthetic melt through a tool. When manufacturing synthetic parts, synthetic melt is first produced from different basic materials in a polymerization process in a worm machine. Additives such as for example calcium carbonate, woodchips, glass beads or the like may also be added to the synthetic melt. As used herein, the term "synthetic melt" may also refer to melt produced from renewable resources, such as proteins for example. The worm machine may be a compounder, an extruder, a worm mixer or a similar device for manufacturing synthetic melt.

EP 0 564 884 A1, which is incorporated by reference in its entirety, describes a worm machine, in which different basic materials are mixed and kneaded by means of synchronously running worm shafts until a fluid melt of synthetic material is provided.

To manufacture synthetic granules, which are then further processed for example in injection molding machines for synthetic materials, synthetic melt is pressed at up to 30 bar through a tool, such as, for example, a perforated disc. To manufacture a synthetic material profile or a synthetic material molded part, synthetic melt is pressed in an extrusion process at up to 300 bar through a suitable extrusion die or molding tool.

As known from the aforementioned EP 0 564 884 A1, the synthetic melt may be transferred from the worm machine to a gear pump, which is known from DE-OS 38 42 988 and is also incorporated herein by reference, and pushed or pressed by the gear pump through the tool in order to obtain the desired granules, profile or molded part.

One of the disadvantages of a separate gear pump is, however, that it is expensive to manufacture because it has its own drive and requires its own control system. Another problem of the gear pump having a distinct drive is that, particularly, at low rotational speeds of up to 50 rpm, a design-inherent pulsation may develop that makes a transport of the melt of synthetic material into the gear pump more difficult. Additionally, during transfer of the synthetic melt to the tool, not all the melt of synthetic material is pressed through the tool. In particular, a portion of the synthetic melt returns back (e.g., flows back to) to the pump inlet opening, where a non-negligible initial pressure may correspondingly build up. However, since the initial pressure is not uniform, but may rather occur at pulse-like intervals, a pulsation occurs. In order to overcome a pulsating initial pressure, the melt should be transferred at a suitable pressure, which may require a sufficient pressure buildup at the end of the worm machine.

A single worm pump having its own drive is typically used instead of the gear pump. However, a non-negligible initial pressure may also bear on the pump inlet in the single worm pump, which needs to be overcome by the worm machine to fill the worm channels.

Thus, the use of a gear pump or a single worm pump may merely be advantageous in that the pressure boosting unit of the worm machine may be reduced in size. However, dispensing with boosting the pressure may not be possible because the initial pressure still needs to be overcome by the worm machine.

Another disadvantage of the gear pump and the single worm pump is that, after the end of the operation, a portion of the synthetic melt remains between the gears or in the worm channel and the gear pump or single worm pump, thereby sometimes requiring laboriously cleaning.

EP 0 564 884 A1 shows integrating the gear pump into the worm machine so that a single drive drives the worm shafts together with the attached gear pump. This has the advantage that the gear pump is operated at the same or similar high rotational speed as the worm shafts so that the pulsation is reduced to a minimum.

EP 1 365 906 B1 describes a two-worm extruder with an integrated gear pump, where two worm elements causing a pressure increase are fastened to the synchronized worm shafts. Due to a specific geometry of the worm, chambers are formed between the worm elements, said chambers allowing for a volumetric forced feed of the synthetic melt to achieve a pressure buildup. However, in the worm machine of EP 0 564 884 A1 and the two-worm extruder of EP 1 365 906 B1, it may be necessary to enlarge the drive of the entire facility because the drive needs to provide both force and energy to increase the pressure and for the mixing and kneading process(es). Therefore, a significantly stronger electric motor and, accordingly, reinforced gears, shafts, housings, etc. may need to be provided.

In the worm machine of EP 0 564 884 A1 and in the two-worm extruder of EP 1 365 906 B1, the integrated gear pump and the worm elements causing the pressure increase have the same rotational speed as the worm shafts used for mixing and kneading. Achieving a homogeneous melt of synthetic material may require a high rotational speed. However, this high rotational speed generates a relatively high level of friction both in the gear pump and at the worm elements, thereby causing the pressure increase that may result in a high force, energy expense and high heat generation. The heat is thereby released to the synthetic melt, which may lead to an adverse effect on or damage the synthetic melt. Therefore, the spectrum of an application for an integrated gear pump and the special worm elements may be limited. This problem may be attenuated by the notion that, depending on the melt of synthetic material used, an individually adapted gear pump or individually configured worm elements may be used. These friction losses also impact the drive and the entire arrangement, which must accordingly have a larger size. This, however, leads to significant equipment-related expenses, high installation costs and a very high level of wear, etc.

The examples disclosed herein are based on a determination that integrating a pressure boosting unit in a worm machine is usually only possible with increased equipment-related expenses and, above all, that compromises are made with regard to the pressure boosting unit and the worm machine so that none of these components may be optimally designed.

DE 10 2013 010 505.6, which is incorporated herein by reference in its entirety, describes a device to manufacture granules of synthetic material, extruded profiles or molded parts from synthetic melt, in which the worm machine is used primarily for mixing and kneading the synthetic melt, and the melt pump is, consequently, designed to increase the pressure.

The melt pump according for building up pressure for pressing a melt of synthetic material through a tool has already been described in the aforementioned DE 10 2013 010 505.6, in which reference is made to its entire content. In a melt pump with two worm conveyors designed in such a consequent manner for increasing the pressure, it may be important to adapt the worm gap formed between the worm flights to the respective melt of synthetic material to be processed. For example, when processing polyethylene (PE), a worm gap of 0.1 mm may be preferred, whereas for a melt of synthetic material with a high proportion of calcium carbonate, for example, a worm gap of 0.5 mm may be preferred. When using other additives, for example wood chips or glass beads, a worm gap of 1 mm or 2 mm may also be suitable.

Based on this premise, the object of the examples disclosed herein is to create a melt pump of the type mentioned above, in which the worm gap between the two worm conveyors may be easily adjusted.

Figure 1:
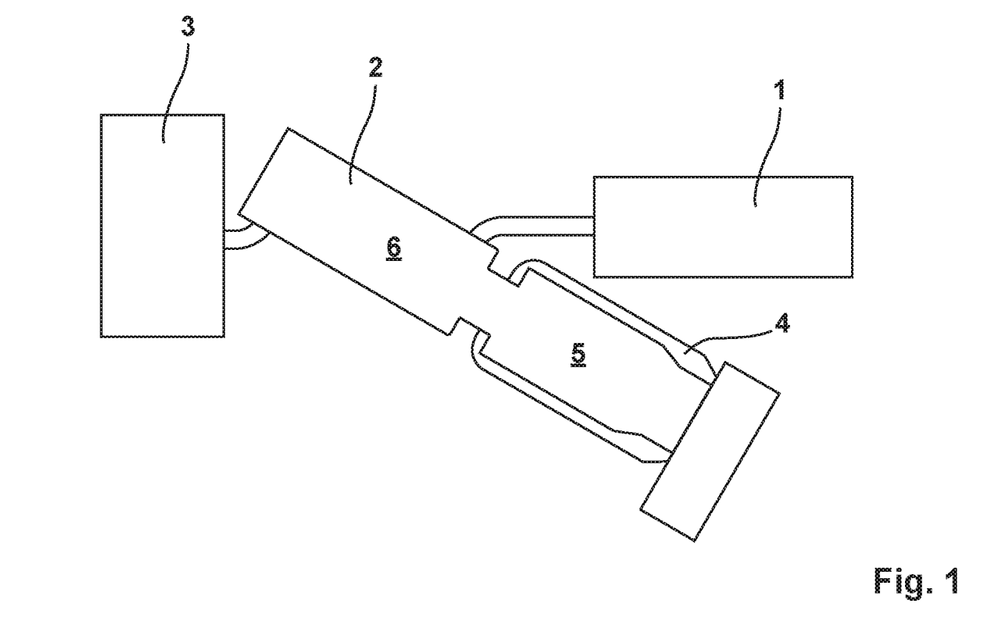
FIG. 1 is a top view of an example device in accordance with the teachings of this disclosure as a schematic representation with an example melt pump.

As a technical solution to this problem, the examples disclosed herein propose a melt pump of the type mentioned above. FIG. 1 schematically shows a device for manufacturing synthetic granules, synthetic profiles or synthetic molded parts from synthetic melt, with a worm machine 1 to mix and knead the basic materials into synthetic melt, a first example of a melt pump 2 according to the examples disclosed herein for compressing the synthetic melt and a tool 3, which is a perforated disc in this example, through which the melt of synthetic material that is compressed at more than 50 bar to produce the desired synthetic granules, for example. In one example, an extrusion tool to manufacture the desired synthetic profiles or the desired synthetic molded parts is used instead of the perforated disc, where a pressure of more than 250 bar may need to be applied to the tool.

In this example, the melt pump is disposed at an angle of 45° relative to the worm machine to reduce the space necessary at the production facility.

Figure 2:
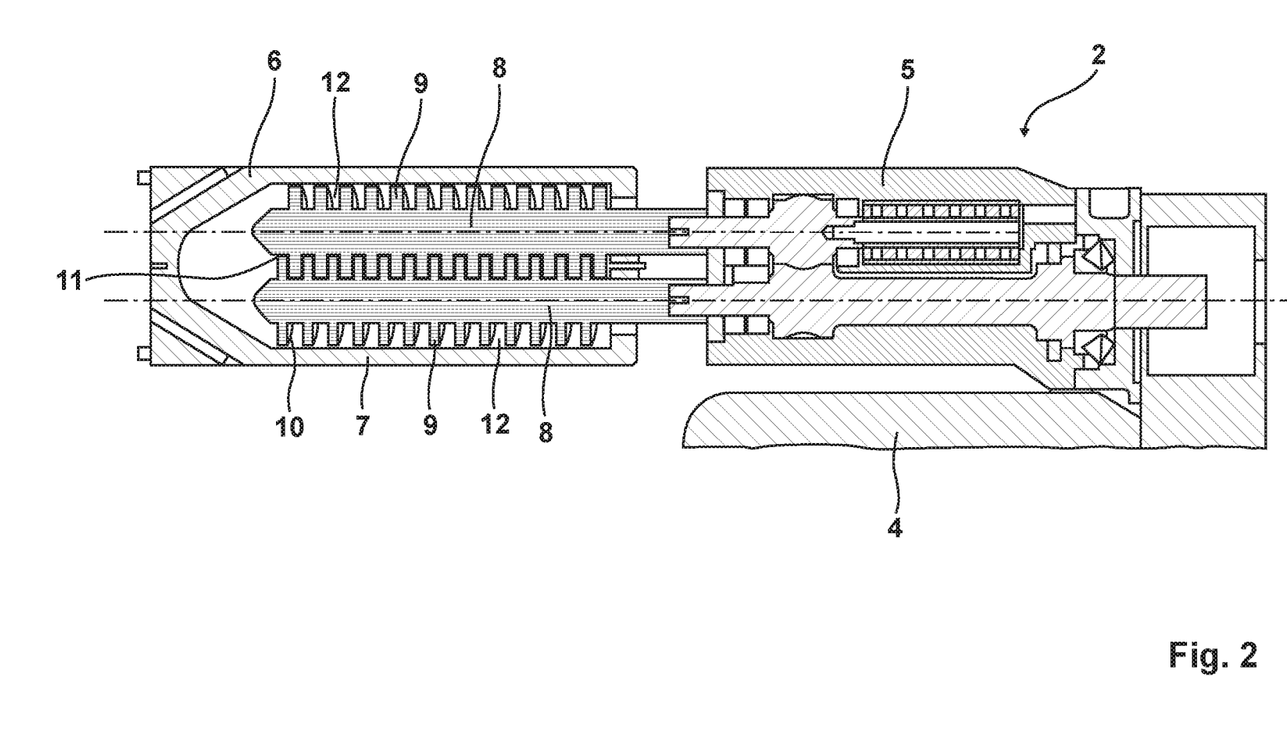
FIG. 2 is a cross-sectional view of the example melt pump of FIG. 1.

As may be gathered more specifically from the example of FIG. 2, the melt pump 2 of the illustrated example has a drive, which has an electric motor 4, a transmission (e.g., a gear box, etc.) 5, and a compressor 6. In this example, the two worm conveyors 8 are disposed relatively parallel in the housing 7 of the compressor 6 and rotate in opposite directions. The worm conveyors 8 are coupled to the transmission 5, which in turn, is coupled to the electric motor 4. Each of the two worm conveyors 8 of the illustrated example has a substantially radially protruding, worm-shaped circumferential worm flight 9, where the worm flight 9 of the one worm conveyor 8 engages with the worm flight 9 of the other worm conveyor 8 in such a manner that a forced feed of the synthetic melt occurs.

In the first example of a melt pump 2 in accordance with the teachings of this disclosure is shown in FIG. 2, where the two worm conveyors 8 rotate in opposite directions. In order to ensure a correct, reciprocally accurate engagement of the worms relative to one another, the worm conveyors 8 of the illustrated example are permanently coupled via the gear 5 so that a synchronous operation of the worm conveyors 8 may be ensured. In this example, both of the worm conveyors 8 are driven synchronously.

In this example, the housing 7 is formed to correspond to the worm conveyors 8 in such a manner that a narrow housing gap 10 remains between the outer edge of the worm flight 9 and the housing 7, which may be approximately amount to between 0.05 mm and 2 mm, and is approximately 0.5 mm in this example.

The radially protruding worm flight 9 and a flank angle on each side of the worm flight 9 is approximately zero degrees, together with plane flanks and, more specifically, a plane flight surface, results in a worm flight 9 with a relatively rectangular cross-section, for example. At the same time, the distance between adjacent worm flights 9 corresponds to the width of the worm flight 9. As a result, in this example, the worm flight 9 of the one worm conveyor 8 fits precisely into the interval of the worm flight 9 of the other worm conveyor 8. Therefore, the worm gap 11 remaining between the worm flights 9 and the worm conveyors 8 is reduced to a minimum and may be between 0.05 mm and 2 mm, and preferably equal to approximately 0.5 mm, for example. The chosen worm gap 11 may depend on the medium used, and the worm gap 11 may be larger as the viscosity of the medium increases. Due to the worm gap 11 being reduced (e.g., reduced to a minimum), a seal may be formed between the adjacent worm conveyors 8 so that a number of worm chambers 12 are formed between the housing 4, the worm flights 9 and the worm conveyors 8, where each worm chamber 12 is relatively closed off by the seal and the synthetic melt contained therein is continuously conveyed. Due to the tight-cogged worm conveyors 8, a reflux of a part of the melt of synthetic material may be reduced (e.g., reduced to a minimum) so that the pressure loss may be also reduced (e.g., reduced to a minimum). This may be referred to as being axially sealed.

To achieve a high conveying output, the worm chambers 12 of the illustrated example are formed to be relatively large. This is achieved by high worm flights 9, where the ratio of the outer diameter ($D_a$) to the core diameter ($D_i$) is approximately equal to two, for example.

In order to implement a relatively smaller construction size of the melt pump 2, in some examples, the worm conveyors 8 of the illustrated example have a length/outer diameter ratio of approximately 3.5.

In this example, the worm chambers 12 formed inside the housing 7 are limited outward by the housing 7 and laterally by the worm flight 9. In the area in which the worm flights 9 of neighboring worm conveyors 8 engage with one other, the worm chambers 12 may be separated by the sealing effect. Therefore, one worm chamber 12 may extend along a single worm channel.

The design of the width of the housing 10 and/or the worm gap 11 may depend on the materials used. For example, when processing highly filled synthetics with a calcium carbonate proportion of 80% at a required pressure of 250 bar, a width of 0.5 mm has proven to be of value. With a medium having a higher fluidity, the gap is made smaller; with a medium having lower fluidity, the gap is made larger, for example. In case hard particles, fibers or pigments are mixed into the medium, the gap may also be designed to be larger.

Thereby, the housing gap 10 and the worm gap 11 of the illustrated example allow for the formation of the quasi closed worm chamber 12, whereby a pressure buildup toward the perforated disc 3 is achieved, amongst others, due to a significant reflux of the medium is, thus, prevented.

In case the pressure locally exceeds the desired amount, the gap may act as compensation because some of the synthetic melt may then escape into the adjacent worm chamber 12, which lowers the local pressure and prevents obstruction and/or damage. Thus, the size of the gap may also have an impact on the pressure compensation. If a higher pressure is required in the tool 3, the housing gap 10 and the worm gap 11 should be reduced in size, for example. This may also apply to the example in which a highly viscous melt of synthetic material is processed. With synthetic melt having a low viscosity, the gap may also be broadened.

As a result, the gap should be chosen for each particular case according to the criteria named here. A gap width between 0.05 mm and 2 mm has proven to be of value. All the examples mentioned may be axially sealed.

The examples disclosed herein of the melt pump 2 having a gap width of 0.5 mm may be used particularly advantageously for highly filled synthetics (e.g., for synthetics with a high solid content, such as calcium carbonate, wood or carbide). As a result, for example, the highly filled synthetic has a calcium carbonate proportion of at least 80%.

Figure 8:
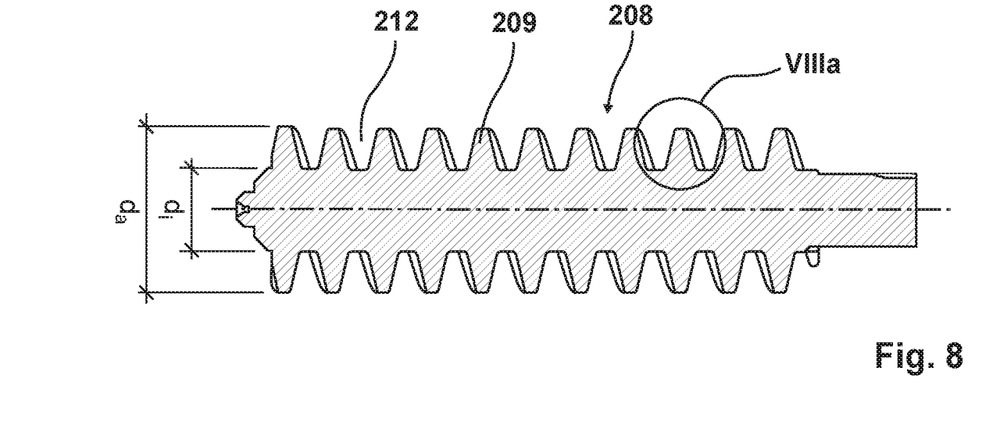
FIG. 8 shows a cross-sectional view of the example worm conveyor according of FIG. 6 along the line VIII-VIII of FIG. 6.
Figure 8A:
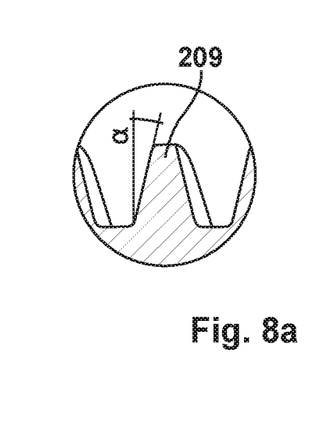
FIG. 8*a* is a magnified detail view of the circle VIIIa of FIG. 8.
Figure 9:
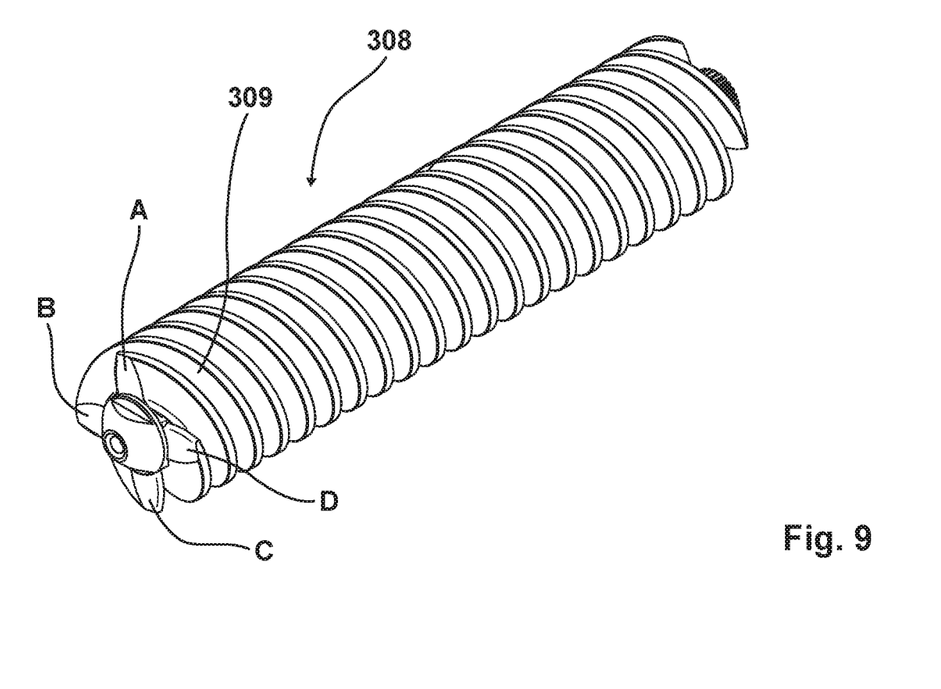
FIG. 9 is a perspective view of an example worm conveyor of a fourth example melt pump in accordance with the teachings of this disclosure.
Figure 10:
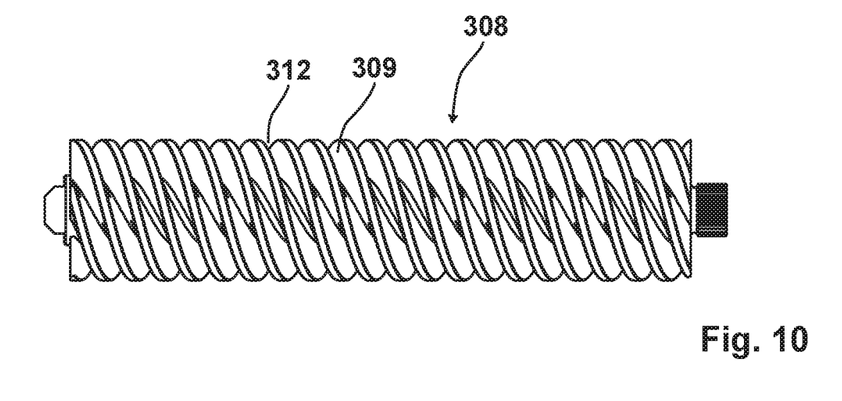
FIG. 10 is a lateral view of the example worm conveyor of FIG. 9.
Figure 11:
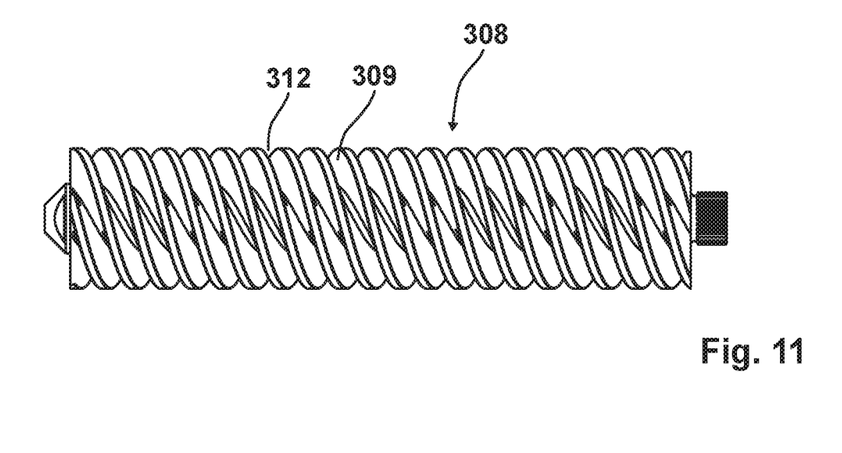
FIG. 11 is a top view of the example worm conveyor of FIG. 9.
Figure 12:
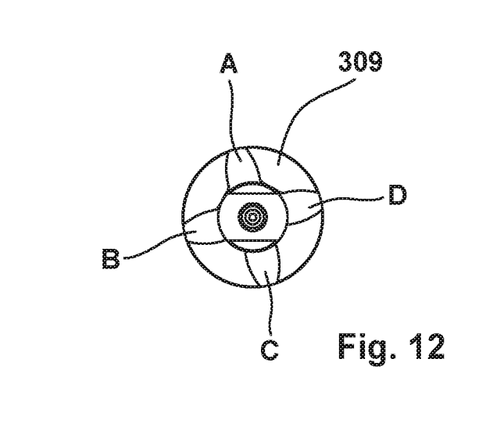
FIG. 12 is a front view of the example worm conveyor of FIG. 9.

Due to the multiplicity of melts of synthetic materials, the flank angles (also called profile angles) may be adapted into any required and/or advantageous form. It has proven advantageous in some examples, at least with counter-rotating worm conveyors 8, to choose a substantially rectangular thread profile as shown in FIG. 2 or a substantially trapeze-shaped thread profile as shown in FIG. 8.

Rectangular thread profiles as shown in FIG. 2 may be also used for processing polyethylene (PE).

Figure 3:
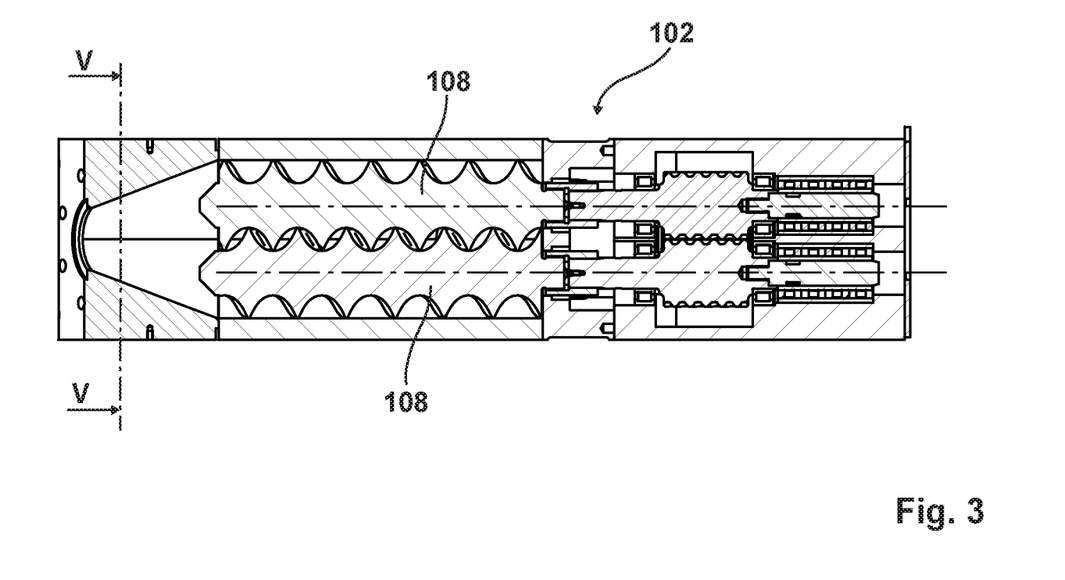
FIG. 3 is a cross-sectional view of a second example melt pump in accordance with the teachings of this disclosure along the line III-III of FIG. 5*a*.
Figure 4:
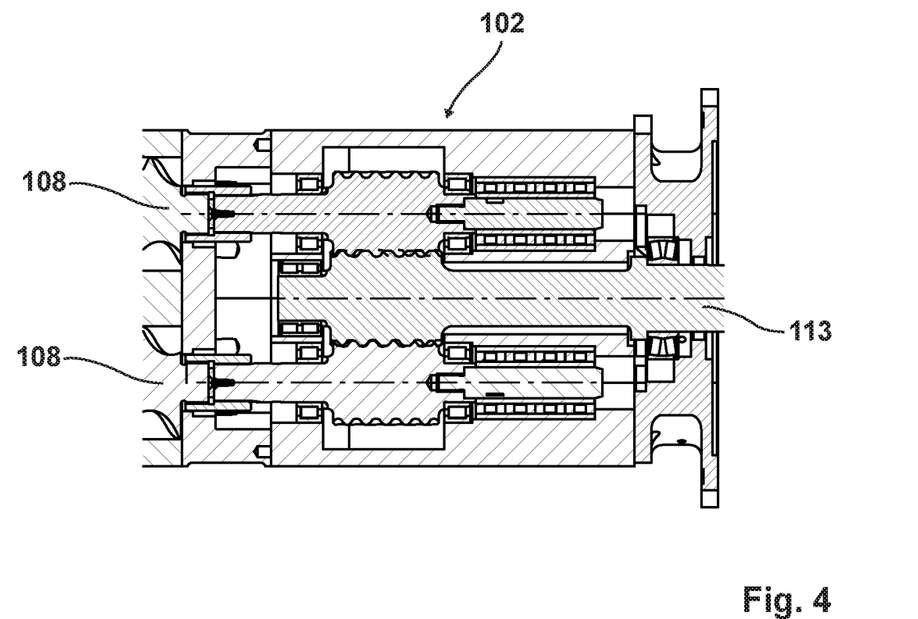
FIG. 4 is a cross-sectional view of the example melt pump of FIG. 3 along the line IV-IV of FIG. 5*b*.
Figure 5A:
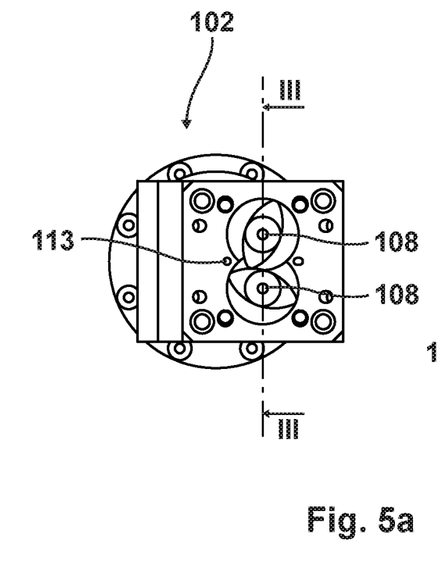
FIGS. 5*a* and 5*b* is a representation of a cross-section of the example melt pump of FIG. 3 along the line V-V of FIG. 3.
Figure 5B:
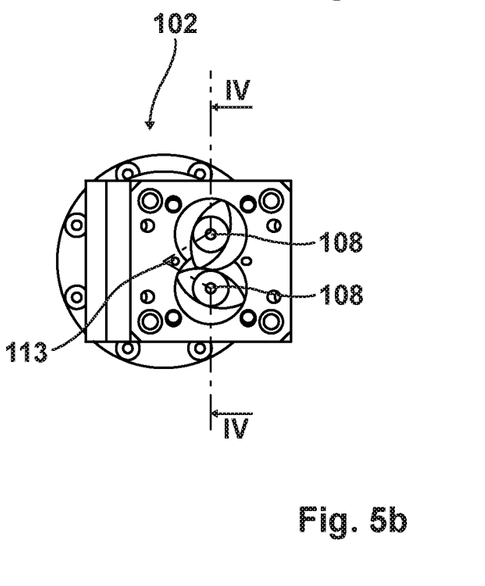

In the second example of a melt pump 102 according to the examples disclosed herein and as shown in FIGS. 3-5, the two worm conveyors 108 rotate in the same direction and are driven by a common drive shaft 113, for example. The worm flights of the worm conveyors 108 may engage with one another other in such a manner that a reduced (e.g., minimal worm) gap remains.

This type of highly filled synthetic materials may be transported and compressed by the melt pump 2, 102 in a material preserving manner, where the synthetic material enters the melt pump 102 at ambient pressure and leaves the melt pump 102 at a pressure of approximately 50 bar to 600 bar, and preferably 400 bar. In this example, the ratio of $D_a$ to $D_i$ is approximately equal to 2 to achieve a relatively high conveying output, for example.

Figure 6:
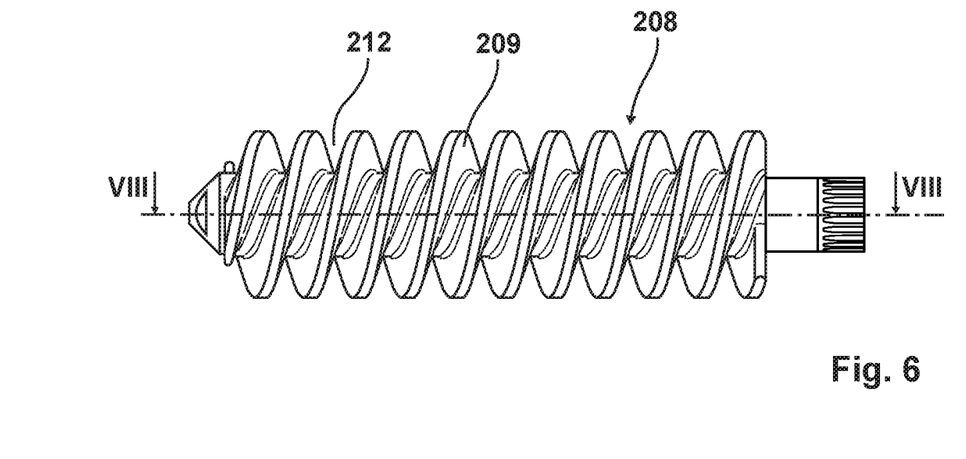
FIG. 6 is a lateral view of an example worm conveyor of a third example melt pump in accordance with the teachings of this disclosure.
Figure 7:
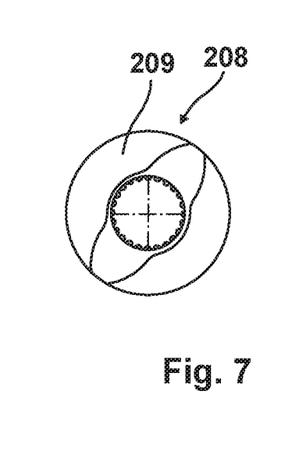
FIG. 7 is a front view of the example worm conveyor of FIG. 6.

In FIGS. 6-8, a worm conveyor 208 of a third example melt pump in accordance with the teachings of this disclosure is shown. This worm conveyor 208 of the illustrated example is double-threaded and its worm flights 209 are designed with a trapezoidal cross-section with a flank angle of 13°. In this example, the worm conveyor 208 is used in a counter-rotating manner and is used, preferably, for processing PVC. In this example, axially sealed worm chambers 212 are formed, which may achieve a desirable pressure buildup and forced feed. In this example, the ratio of $D_a$ to $D_i$ is approximately equal to 2.

In FIGS. 9-12, a worm conveyor 309 of a fourth example melt pump in accordance with the teachings of this disclosure is shown. The worm conveyor 308 of the illustrated example is quadruple threaded (A, B, C, D) and its worm conveyors 309 have a relatively rectangular cross-section with a flank angle of approximately 0°. The worm conveyor 308 is used in a counter-rotating manner and is, preferably, used to process a medium containing proteins. In this example, axially sealed worm chambers 312 are formed, which achieve a desired pressure buildup and forced feed. In this example, the ratio of $D_a$ to $D_i$ is approximately equal to 2.

Figure 13:
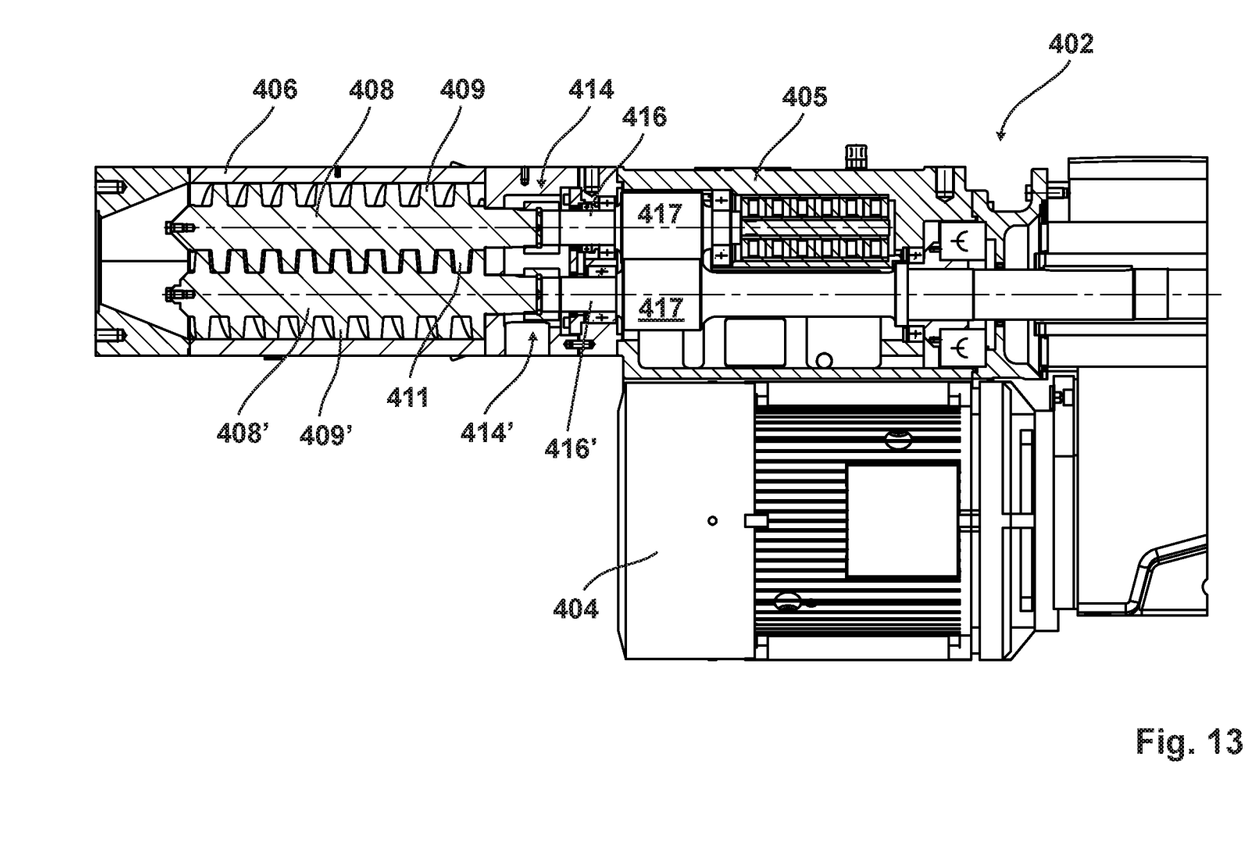
FIG. 13 is a cross-sectional lateral view of a fifth example melt pump in accordance with the teachings of this disclosure.
Figure 14:
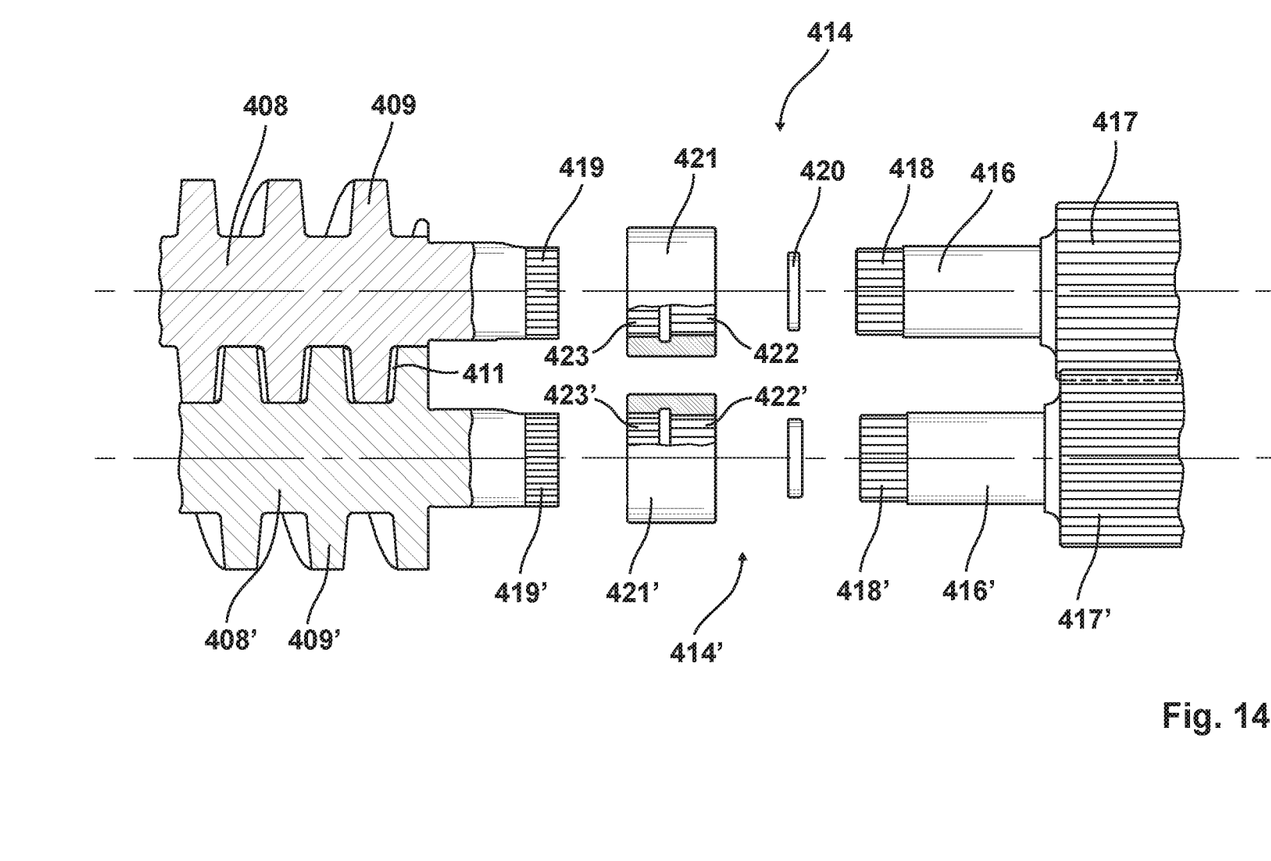
FIG. 14 is an exploded view of a coupling of the example melt pump of FIG. 13.

In the fifth example of a melt pump 402 according to the examples disclosed herein is shown in FIGS. 13 and 14, a compressor 406, a transmission (e.g., a gear box, etc.) 405 and a drive 404 have an identical configuration to that of the first example of FIG. 2, where the a difference is that, in the fifth example, two worm conveyors 408 and 408' are detachably coupled to an output shaft 416, 416' of the transmission 405 by way of respectively one coupling 414 and 414'. Respectively, in this example, one helical gearing 417, 417' is formed on each of the two output shafts 416, 416', said gearings engaging with each other in such a manner that the two output shafts 416, 416' and, thus, also the worm conveyors 408, 408' are thereby synchronized. As a result, a relatively precise synchronous run of the worm conveyors 408, 408' is achieved so that the position of the worm flights 409, 409' relative to one other do not significantly change during operation.

Each coupling 414, 414' of the illustrated example comprises an output gear 418, 418' provided at one free end of the output shaft 416, 416', a drive gear 419, 419' provided at one corresponding free end of the worm conveyor 408, 408', an adjustment disc 420, 420' and a coupling sleeve 421, 421'. In this example, the coupling sleeve 421, 421' is equipped on its inner side with an output gearing 422, 422' and a drive gearing 423, 423', where the output gearing 422, 422' is formed on the output shaft 416, 416' so that it corresponds to the output gear 418, 418', whereas the drive gearing 423, 423' of the illustrated example is formed on the worm conveyor 408, 408' so that it corresponds to the drive gear 419, 419'. In this example, a spur gearing according to DIN 5480 has been chosen.

In the mounted state, the coupling sleeve 421, 421' of the illustrated example is slid over both the output gear 418, 418' and the drive gear 419, 419' so that the output gearing 422, 422' is engaged with the output gear 418, 418' and the drive gearing 423, 423' is engaged with the drive gear 419, 419'. As a result, the coupling sleeve may transmit the forces and torques from the output shaft 416, 416' to the worm conveyor 408, 408'.

In order for the worm flights 409, 409' of the worm conveyors 408, 408' meshing with each other to continuously engage with each other, it may be necessary to adjust the worm conveyors 408, 408' relative to one another, for example. This may be accomplished by rotating one or both worm conveyors 408, 408' around their respective longitudinal axes until the desired position is reached. In doing so, the size of the worm gap 411 may also be adjusted to the desired dimension.

In this example, the output gear 418, 418' of the output shaft 416, 416' has a number of teeth, that differs from the number of teeth in the drive gear 419, 419' of the worm conveyor 408, 408'.

Therefore, the worm conveyor 408, 408' of the illustrated example may be displaced either in accordance with the pitch of the drive gear 419, 419' or in accordance with the pitch in the output gear 418, 418'. The worm conveyor 408, 408' may be displaced in the drive gear 419, 419' as well as in the output gear 418, 418'. Additionally, it is also possible to displace the first worm conveyor 408 in a different manner from the second worm conveyor 408'.

This results in a plurality of possibilities for positioning the worm conveyors 408, 408' relative to one other. In practice, the gearing combination for a relatively optimal positioning of the worm conveyors 408, 408' relative to one other may be calculated by software. In this example, the coupling sleeve 421, 421' is then slid onto the output shafts 416, 416' according to the determined gearing combination and the worm conveyors 408, 408' are correspondingly slid into the coupling sleeves 421, 421' in the determined position.

The position of the respective worm conveyors 408, 408' in the axial direction is adjusted by means of the adjustment disc 420, 420', for example. First, the actual position of the worm flights 409, 409' relative to each other is determined. Correspondingly, a first adjustment disc 420 with a first thickness and a second adjustment disc 420' with a second thickness are then chosen to obtain the desired worm gap 411, where the first adjustment disc 420 is used between the first worm conveyor 408 and the first output shaft 416, and where the second adjustment disc 420' is used between the second worm conveyor 408' and the second output shaft 416', for example.

In the fifth example of FIGS. 13 and 14, the pitches (e.g., the number of teeth of the output gears 418 of the first and second output shaft 416, 416') are equal. The same may apply to the drive gears 419, 419' of the first and second worm conveyor 408, 408'.

Figure 15:
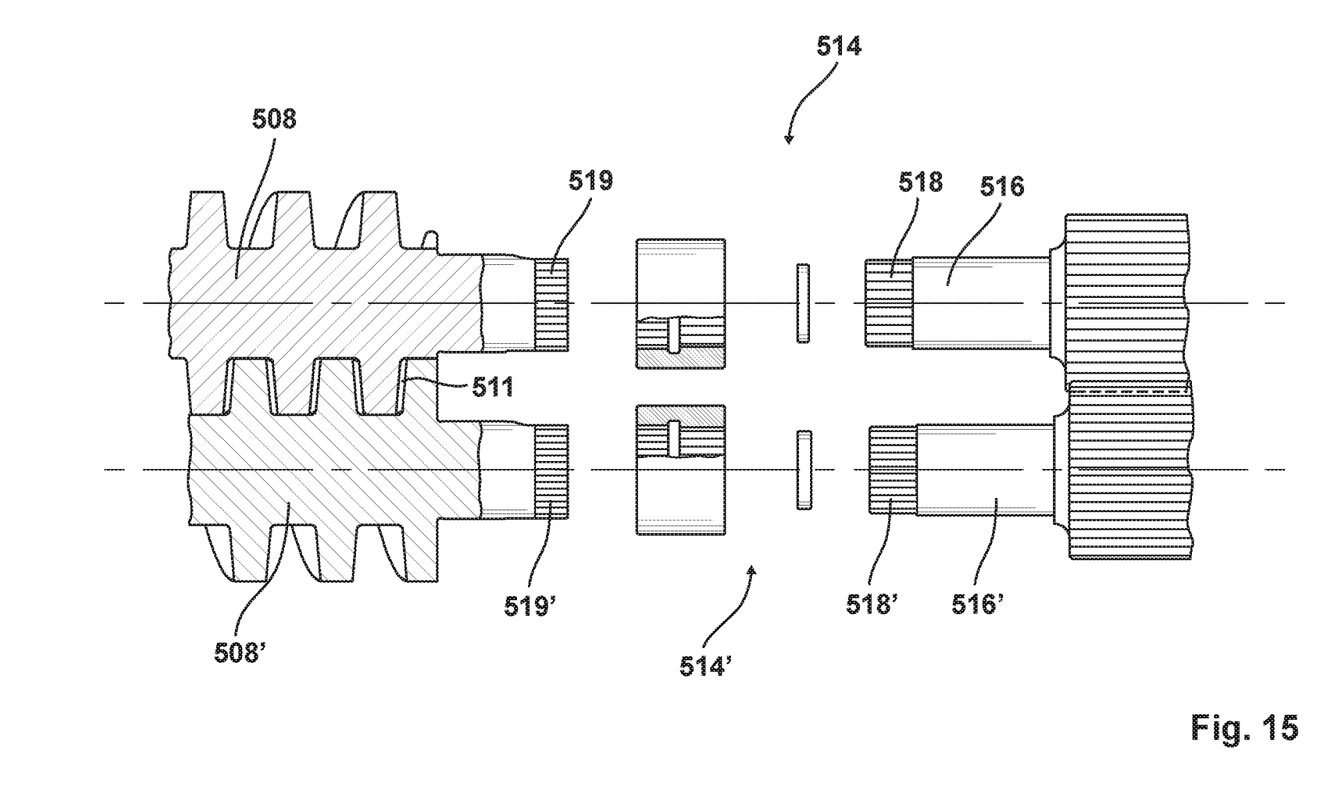
FIG. 15 is an exploded view of a coupling of a sixth example melt pump in accordance with the teachings of this disclosure.

The sixth example of a melt pump in accordance with the teachings of this disclosure is shown in FIG. 15 and differs from the fifth example shown in FIGS. 13 and 14 by the fact that the output gear 518 of the first output shaft 516 has a different number of teeth than the output gear 518' of the second output shaft 516'. Therefore, in this example, the output gear 518 of the first output shaft 516 is designed as a spur gearing with a total of 16 teeth, whereas the output gear 518' of the second output shaft 516' has a total of 17 teeth and the drive gear 519 of the first worm conveyor 508 and the drive gear 519' of the second worm conveyor 508' both have 18 teeth, respectively. Therefore, in this example, three different gears are provided in the two couplings 514, 514' so that the number of possible gearing combinations is significantly increased, the consequence being that the worm gap 511 is even more precisely adjustable.

In another example, all four gears provided in the two couplings have a different number of teeth so that even more gearing combinations may be available.

A melt pump in accordance with the teachings of this disclosure has the advantage that the worm conveyors may be quickly and easily separated from the transmission due to easily releasable coupling. This, in turn, also makes it possible to rotate the worm conveyors relative to each other around the longitudinal axis and to couple them again with the transmission in this new angular position. As a result, the worm gap formed between the worm conveyors may be adapted to the synthetic melt to be processed. It has turned out to be particularly advantageous to provide the output gear on the output shaft with a different pitch than the drive gear on the worm conveyor. The different pitch (e.g., the different number of teeth in the respective gear) provides a much greater number of positions in which the worm conveyor may be attached to the drive shaft. Thus, the worm gap may be much more precisely adjusted.

In a preferred example, the drive gears of the first and second worm conveyor also have a different number of teeth. With different gears provided, the number of possible positions further increases.

The same may be true if the output gears of the first and second output shaft have a different number of teeth.

In a particularly preferred example, all four gears located on the two output shafts and the two worm conveyors have a different pitch so that, particularly, many positions are available for adjusting the angle of the worm conveyors. As a result, it is possible to adjust the worm gap in a particularly precise manner. Since determining the ideal gear combination is very complex, appropriate software may be used.

In another preferred example, the coupling includes an adjustment disc, with which the axial position of the worm conveyor may be adjusted. In this example, the actual axial position of the worm conveyor is determined and the thickness of the adjustment disc is chosen so that the worm conveyor takes up the desired position in the mounted state.

In a preferred example, the adjustment disc of the first coupling may have a different thickness than the adjustment disc of the second coupling so that the worm gap may also be adjusted by way of the adjustment discs to allow for an even more precise adjustment of the worm gap.

In another advantageous example, two worm conveyors are disposed above one another (e.g., vertically relative to each other). This is advantageous in that the inlet opening may be centrally arranged relative to the worm conveyors so that the arriving melt is well-captured by both worm conveyors and a high degree of filling is achieved. Additionally, this also has the advantage that the inlet opening may be arranged laterally on the melt pump so that a radial inflow and a radial outflow of the medium take place. This, in turn, allows for an angled arrangement of the melt pump relative to the worm machine with the advantage that the total length of the device is reduced. For example, the melt pump may be arranged at an angle of 45° relative to the worm machine, which allows significant space savings.

In an advantageous example, the worm conveyors are designed in such a manner that the ratio of the outer diameter (Da) to the core diameter (Di) is approximately equal to 2. In another example, when using proteins in the melt of synthetic material, the ratio of the outer diameter to the core diameter is approximately equal to 5. Depending on the type of melt of synthetic material, a ratio of Da to Di between 1.6 and 6 may also be chosen. As a result, a great displacement volume may be achieved with a comparatively thin and, thus, cost-effective worm.

A device designed in accordance with the teachings of this disclosure has the advantage that there is no significant initial pressure at the inlet opening of the melt pump due to the forced feed of the melt in the melt pump so that the melt may move from the worm machine to the melt pump with minimal pressure (e.g., without pressure). Only the forces required for transporting the melt of synthetic material, for example, for overcoming the inertia of the melt, the friction and so forth (also referred to as melt pressure), should be applied by the worm machine and may lead to a minor pressure increase of 0.1 to 0.4 bar depending on the composition of the melt. However, such forces may be applied by the worm of the worm machine itself so that a pressure boosting device may be dispensed with. This, in turn, has the advantage that a worm machine without a pressure boosting device may be operated with a smaller drive, which is a smaller electric motor in this example, and, if applicable, with a smaller transmission, a smaller worm, a smaller housing and other smaller components since the transmitted forces are now significantly less. This leads to a significant reduction of the production costs of the worm machine, and is also associated with a reduction of energy costs.

Dispensing with the pressure boosting device has the additional advantage that the worm machine may now be consequently designed for mixing basic materials and for producing the melt of synthetic material, which increases the efficiency and, thus, the cost-effectiveness of the worm machine. At the same time, the worm machine is subjected to less stress, which may lead to less overall wear.

Yet another advantage is that after separating the melt pump from the worm machine, the melt pump may be built and designed only for achieving an effective pressure increase.

As an unexpected consequence, it has turned out during construction and operation of a prototype of the device according to the examples disclosed herein that the sum of the electric power of the drives of the worm machine and the melt pump was less than the electric power of a corresponding known devices. Thus, separating the worm machine and the melt pump not only resulted in a reduction of production costs of the device (e.g., due to smaller components, etc.) but also in a reduction of the energy costs for manufacturing synthetic granules, extruded profiles and molded parts.

In another advantageous example, the worm flights have a substantially rectangular or trapezoidal thread profile in order for a good forced feed of the melt to be achieved, more specifically when the flank angle (e.g., the profile angle) is chosen between 0° and 20°. The design of the worm flights may be adapted to the melt to be used. For example, a profile angle of 0° has proved to be of value when processing polyethylene (PE), whereas PVC may be better processed with a profile angle of 13°.

In a preferred example, the worm flight has a plane surface, which also contributes to a cost-effective production.

Since the worm flight is designed with a plane flank, a flank angle of 0° and a plane surface, the worm flight has a substantially rectangular cross-section. More specifically, when the interval of the worm flights after each pitch corresponds roughly to the width of the worm flight, a relatively uniform and relatively minimal gap is achieved, by which the corresponding worm chamber is sealed off. This seal makes it possible to build up a high pressure on the tool, more specifically, on the perforated disc, for example.

In yet another preferred example, the worm flights of both worm conveyors engage with each other in such a manner that the worm gap remaining at the narrowest place forms a gap seal. This gap seal prevents, on the reflux of the medium and increases the forced feed, and acts as overpressure compensation. The forced feed generates a high pressure buildup and, simultaneously, the pressure compensation prevents damage to the medium, more specifically when the gap seal is adapted to the medium to be processed. The same advantages may also apply to the housing gap.

Another advantage consists in that the two worm conveyors may be driven with a relatively low output, which leads to a smaller drive motor and a lesser energy consumption.

In another preferred example, a number of worm chambers, in which the medium is contained, are formed between the housing and the worm conveyors or their worm flights. As a result, the worm chambers are designed to be quasi-closed in accordance with the gap seal of the worm and/or housing gap so that the desired pressure may be built up and a forced feed of the melt of synthetic material is achieved, but in case of a (locally) excessive pressure, a certain compensation of the pressure occurs.

In a preferred example, a worm chamber extends along the pitch of a worm flight. In this example, the beginning and the end of the worm chamber are thereby located at the intersection of the two worm conveyors (e.g., in the plane that is defined by the axes of the two worm conveyors). This has the advantage that the medium occupies a defined place and is not significantly mixed (e.g., not mixed) with another medium. At the same time, this allows for a relatively efficient pressure build up on the perforated disc.

In another preferred example, a housing gap is formed between the worm flight and the housing, and a worm gap is formed between the worm flight and its adjacent worm conveyor, both forming a gap seal so that the medium is substantially held in the respective worm chamber without a significant reflux of the medium occurring through the gaps (e.g., the gap seals) into an adjacent rearward worm chamber. This is advantageous in that sealing is thereby achieved between the worm chambers, which allows for a high pressure in each worm chamber, a forced feed of the melt of synthetic material and a pressure of more than 400 bar and up to 600 bar on the perforated disc, for example.

In yet another preferred example, the housing gap and/or the worm gap has a width approximately between 0.05 mm and 2 mm. The width of the gap and, thus, the size of the gap seal ultimately depend on the medium to be processed and its additives. A gap of 0.5 mm has proven advantageous for highly filled synthetics with a calcium carbonate proportion of 80% and a pressure of 500 bar on the perforated disc.

Yet another advantage is that, due to the cooperation of the two accurately interlocking worm conveyors with the correspondingly configured worm flights, and to the forced feed, a quick pressure buildup takes place so that in a relatively small melt pump, high pressures are achieved, the retention period in the melt pump is small and the thermal and mechanical damage to the melt is relatively small.

In yet another advantageous example, the melt pump is designed in such a manner that the worm conveyors rotate at rotation speeds between approximately 30 rpm and 300 rpm, and preferably at rotation speeds between approximately 50 rpm and 150 rpm, depending on the type of the melt of synthetic material. This is advantageous in that, at least in most cases, the chosen rotation speed lies above the rotation speed of a gear pump or a single worm pump so that in connection with the geometry-inherent force-feed of the melt, the melt is conveyed without pulsation.

An advantage of a rotation speed limited to a maximum of 300 rpm is that the shear of the polymer chains occurring at relatively high rotation speeds may be avoided.

In a preferred example, the melt pump achieves a pressure of approximately more than 250 bar and up to 600 bar on the perforated disc at a length/diameter ratio of the worm conveyor of approximately 2 to 5, and preferably 3.5. This is advantageous in that the melt pump may be manufactured at a relatively low cost and used in a space-saving manner.

Other advantages of the melt pump according to the examples disclosed herein may be gathered from the enclosed drawings and the embodiments described in the following. According to the examples disclosed herein, the aforementioned features and those developed in the following may also be used individually or in any combination of each other. The mentioned example must not be understood as an exhaustive enumeration but rather as examples.

From the foregoing, it will appreciate that the above disclosed methods, apparatus and articles of manufacture allow worm conveyors that nay be quickly and easily separated from a transmission to allow adaption of the worm conveyors for synthetic melt to be processed, and to be driven with relatively low output. The examples disclosed herein may also not require pressure boosting devices.

This patent arises as a continuation of German Patent Application No. DE 10 2013 021 902.7, filed on Dec. 26, 2013, which is hereby incorporated herein by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A melt pump for building up pressure for pressing synthetic melt through a tool, the melt pump comprising: a compressor with first and second worm conveyors disposed in a housing; a transmission by which the first and second worm conveyors are synchronously drivable; a drive, wherein the transmission is disposed between the drive and the compressor, wherein the first and second worm conveyors have respective corresponding first and second output shafts; and first and second coupling sleeves to couple each of the first and second worm conveyors to the corresponding first and second output shafts to define a respective coupling, wherein the first and second coupling sleeves are to engage first and second output gears, respectively, of the corresponding first and second output shafts, the first and second coupling sleeves are to engage respective first and second drive gears of the corresponding first and second worm conveyors, and wherein: the first drive gear includes first teeth having a first number of teeth contacting and engaging the first coupling sleeve, and the first output gear includes second teeth having a second number of teeth contacting and engaging the first coupling sleeve, the first number of teeth different from the second number of teeth to adjust a worm gap, the second drive gear includes third teeth having a third number of teeth contacting and engaging the second coupling sleeve, and the second output gear includes fourth teeth having a fourth number of teeth contacting and engaging the second coupling sleeve, the third number of teeth different from the fourth number of teeth to adjust the worm gap, and at least three of the first, second, third and fourth numbers of teeth are different from one another.

2. The melt pump according to claim 1, wherein the first number of teeth is the same as the third or fourth numbers of teeth.

3. The melt pump according to claim 1, wherein each coupling comprises an exchangeable adjustment disc, which is disposed between a corresponding one of the first and second output shafts and the corresponding one of the first and second worm conveyors.

4. The melt pump according to claim 3, wherein an adjustment disc of a first coupling between the first output shaft and the first worm conveyor has a different thickness than an adjustment disc of a second coupling between the second output shaft and the second worm conveyor.

5. The melt pump according to claim 1, wherein the first output shaft is operatively coupled to the second output shaft via a helical gearing to synchronously drive the first and second worm conveyors.

6. The melt pump according to claim 1, wherein each of the first and second worm conveyors is configured in such a manner that a ratio of an outer diameter (Da) to a core diameter (Di) is between 1.6 and 6.

7. The melt pump according to claim 1, wherein worm flights disposed on each of first and second worm conveyors are configured to enable a forced feed of a medium.

8. The melt pump according to claim 7, wherein the worm flights have a rectangular or trapezoidal thread profile, wherein each worm flight has a profile angle ($\alpha$) between 0° and 20°.

9. The melt pump according to claim 7, wherein the worm flights and the first and second worm conveyors are configured to correspond to one another and disposed to engage each other in such a manner that at least one worm chamber is formed between the housing and the worm flights of the first and second worm conveyors, said chamber being closed except for at least one of a housing gap or the worm gap.

10. The melt pump according to claim 7, wherein the housing is configured so that it corresponds to an outer contour of the first and second worm conveyors in such a manner that a housing gap remaining between each of the first and second worm conveyors and the housing is small enough so that the housing gap defines a gap seal, wherein the worm flights of the first and second worm conveyors are configured to correspond to each other and are disposed to engage with one another in such a manner that the worm gap remaining between the worm flights of the first and second worm conveyors is small enough that each worm gap forms a gap seal.

11. The melt pump according to claim 1, wherein the drive and the transmission are designed for a rotational speed of the worm conveyors between 30 rpm and 300 rpm.

12. The melt pump according to claim 1, wherein each of the first and second worm conveyors has a length/diameter ratio of 2 to 5.

13. The melt pump according to claim 1, wherein at least one of the first and second worm conveyors is displaceable relative to the other of the first and second worm conveyors.

14. The melt pump according to claim 1, wherein the worm gap is between 0.05 millimeters and 2.0 millimeters.

15. The melt pump according to claim 1, wherein the tool is provided synthetic melt from the melt pump at a pressure between 50 bar to 600 bar.

16. The melt pump according to claim 1, wherein the melt pump is angled at 45 degrees from the tool.

17. A melt pump for building up pressure for pressing synthetic melt through a tool, the melt pump comprising: a compressor with first and second worm conveyors disposed in a housing; a transmission by which the first and second worm conveyors are synchronously drivable; a drive, wherein the transmission is disposed between the drive and the compressor, wherein the first and second worm conveyors have respective corresponding first and second output shafts; and first and second coupling sleeves to couple each of the first and second worm conveyors to the corresponding first and second output shafts to define a respective coupling, wherein the first and second coupling sleeves are to engage first and second output gears, respectively, of the corresponding first and second output shafts, the first and second coupling sleeves are to engage respective first and second drive gears of the corresponding first and second worm conveyors, and wherein: the first drive gear includes first teeth having a first number of teeth contacting and engaging the first coupling sleeve, and the first output gear includes second teeth having a second number of teeth contacting and engaging the first coupling sleeve, the second drive gear includes third teeth having a third number of teeth contacting and engaging the second coupling sleeve, and the second output gear includes fourth teeth having a fourth number of teeth contacting and engaging the second coupling sleeve, and at least three of the first, second, third and fourth numbers of teeth are different from one another to adjust a worm gap between the first and second worm conveyors.

18. The melt pump according to claim 17, further including first and second exchangeable adjustment discs each disposed between a corresponding one of the first and second output shafts and a corresponding one of the first and second worm conveyors, the first and second exchangeable adjustment discs having different thicknesses from one another.

19. The melt pump according to claim 17, wherein each of the first and second worm conveyors is configured in such a manner that a ratio of an outer diameter (Da) to a core diameter (Di) is between 1.6 and 6.

20. The melt pump according to claim 17, wherein the worm gap is between 0.05 millimeters and 2.0 millimeters.

21. The melt pump according to claim 17, wherein the tool is provided synthetic melt from the melt pump at a pressure between 50 bar to 600 bar.

22. A melt pump for building up pressure for pressing synthetic melt through a tool, the melt pump comprising: a compressor with first and second worm conveyors disposed in a housing; a transmission by which the first and second worm conveyors are synchronously drivable; a drive, wherein the transmission is disposed between the drive and the compressor, wherein the first and second worm conveyors have respective corresponding first and second output shafts; and first and second coupling sleeves to couple each of the first and second worm conveyors to the corresponding first and second output shafts to define a respective coupling, wherein the first and second coupling sleeves are to engage first and second output gears, respectively, of the corresponding first and second output shafts, the first and second coupling sleeves are to engage respective first and second drive gears of the corresponding first and second worm conveyors, and wherein: the first drive gear includes first teeth having a first number of teeth contacting and engaging the first coupling sleeve, and the first output gear includes second teeth having a second number of teeth contacting and engaging the first coupling sleeve, the second drive gear includes third teeth having a third number of teeth contacting and engaging the second coupling sleeve, and the second output gear includes fourth teeth having a fourth number of teeth contacting and engaging the second coupling sleeve, and the first, second, third and fourth numbers of teeth are different from one another to adjust a worm gap and enable an angular adjustment between the first and second worm conveyors.

23. The melt pump according to claim 22, wherein each of the first and second worm conveyors is configured in such a manner that a ratio of an outer diameter (Da) to a core diameter (Di) is between 1.6 and 6.

24. The melt pump according to claim 22, wherein the worm gap is between 0.05 millimeters and 2.0 millimeters.

25. The melt pump according to claim 22, wherein the tool is provided synthetic melt from the melt pump at a pressure between 50 bar to 600 bar.

26. The melt pump according to claim 22, wherein each coupling comprises an exchangeable adjustment disc, which is disposed between a corresponding one of the first and second output shafts and the corresponding one of the first and second worm conveyors.

27. The melt pump according to claim 26, wherein an adjustment disc between the first output shaft and the first worm conveyor has a different thickness than an adjustment disc between the second output shaft and the second worm conveyor.

* * * * *